(12) United States Patent
Webb

(10) Patent No.: US 12,342,890 B2
(45) Date of Patent: Jul. 1, 2025

(54) ARTIFICIAL TREE AND METHOD OF MAKING

(71) Applicant: Terry K. Webb, Tarboro, NC (US)

(72) Inventor: Terry K. Webb, Tarboro, NC (US)

( * ) Notice: Subject to any disclaimer, the term of this patent is extended or adjusted under 35 U.S.C. 154(b) by 266 days.

(21) Appl. No.: 18/312,324

(22) Filed: May 4, 2023

(65) Prior Publication Data

US 2023/0270195 A1 Aug. 31, 2023

Related U.S. Application Data

(63) Continuation-in-part of application No. 17/157,005, filed on Jan. 25, 2021, now abandoned, and a continuation-in-part of application No. 15/951,729, filed on Apr. 12, 2018, now Pat. No. 10,932,508.

(51) Int. Cl.
| | | |
|---|---|---|
| *A41G 1/00* | (2006.01) | |
| *B29C 44/12* | (2006.01) | |
| *B29K 25/00* | (2006.01) | |
| *B29K 105/04* | (2006.01) | |
| *B29K 705/02* | (2006.01) | |
| *B29L 31/00* | (2006.01) | |

(52) U.S. Cl.
CPC .......... *A41G 1/007* (2013.01); *B29C 44/1209* (2013.01); *B29C 44/1271* (2013.01); *B29K 2025/06* (2013.01); *B29K 2105/04* (2013.01); *B29K 2705/02* (2013.01); *B29L 2031/7026* (2013.01)

(58) Field of Classification Search
CPC ...................................................... A41G 1/007
USPC ........................................................ 428/18
See application file for complete search history.

(56) References Cited

U.S. PATENT DOCUMENTS

| 5,316,807 A | 5/1994 | Hill | |
|---|---|---|---|
| 6,117,503 A | 9/2000 | Lee | |
| 6,599,591 B1 * | 7/2003 | Scott | ...... A41G 1/007 428/32 |
| 2005/0181688 A1 | 8/2005 | Roberts | |

FOREIGN PATENT DOCUMENTS

| KR | 2003-0077056 | 10/2003 |
|---|---|---|
| KR | 10-1216281 | 12/2012 |

* cited by examiner

*Primary Examiner* — Brent T O'Hern
(74) *Attorney, Agent, or Firm* — Passe Intellectual Property; James G Passe

(57) ABSTRACT

The present invention is an artificial tree consisting of a shape such as conical wherein there is an artificial outer layer, e.g., artificial grass, a solidified foam core, and a post molded into the foam core.

5 Claims, 6 Drawing Sheets

ARTIFICIAL TREE AND METHOD OF MAKING

STATEMENT REGARDING PRIOR DISCLOSURES BY THE INVENTOR OR A JOINT INVENTOR

This application is a continuation in-part of U.S. Non-Provisional patent application Ser. No. 17/157,005 which is a divisional of U.S. non-provisional patent application Ser. No. 15/951,729 filed on Apr. 12, 2018, which is incorporated herein in its entirety by reference.

CROSS-REFERENCE TO RELATED APPLICATIONS not applicable.

STATEMENT REGARDING FEDERALLY SPONSORED RESEARCH OR DEVELOPMENT not applicable.

THE NAMES OF THE PARTIES TO A JOINT RESEARCH AGREEMENT not applicable.

INCORPORATION-BY-REFERENCE OF MATERIAL SUBMITTED ON A READ-ONLY DISC, AS A TEXT FILE OR AN XML FILE VIA THE PATENT ELECTRONIC SYSTEM not applicable.

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to an artificial tree. In particular, the invention relates to a solid core artificial tree and the method of making the tree.

Description of Related Art

The making and use of artificial trees, including plants and bushes, has been widely used. Most people are familiar with artificial Christmas trees which require assembly and disassembly. The quality of such trees varies wildly and they are known for having short life spans due to their fragile nature even though they are normally only intended for indoor use.

Molded plants and flowers are readily available to construct one's own artificial plant. They offer beauty without the perishable nature of live plants. There is everything from small plants to large trees, such as palm trees. In general, these too are really only suitable for indoor use and easily come apart during use. Some methods of making sturdier trees are known. More durable outdoor trees tend to be made of heavy metal framing, need injection molding equipment, and take an extensive amount of labor to construct. They are also very expensive to make and costly to install for their intended use. Many designs also require a sub frame to hold the shape of the tree. Accordingly, the use of artificial trees outdoors is limited if non-existent.

BRIEF SUMMARY OF THE INVENTION

The present invention relates to an artificial tree having a lightweight expanded foam core, straight tube, and a polymeric woven outer layer and overcomes the above problems and limitations with artificial trees. In addition, it is a much cheaper process to produce each tree than prior methods and produces a tree with outstanding outdoor weather resistance.

Accordingly, in one embodiment, there is an artificial tree comprising:
a) a polymeric woven outer layer in a predetermined shape resembling a tree;
b) a solidified expanded foam core;
c) a straight tube or straight post molded into the solidified foam core; and
d) wherein the polymeric woven_outer layer is fused to the solidified expanded foam core to form a straight artificial trunk.

DETAILED DESCRIPTION OF THE INVENTION

Figure 1:
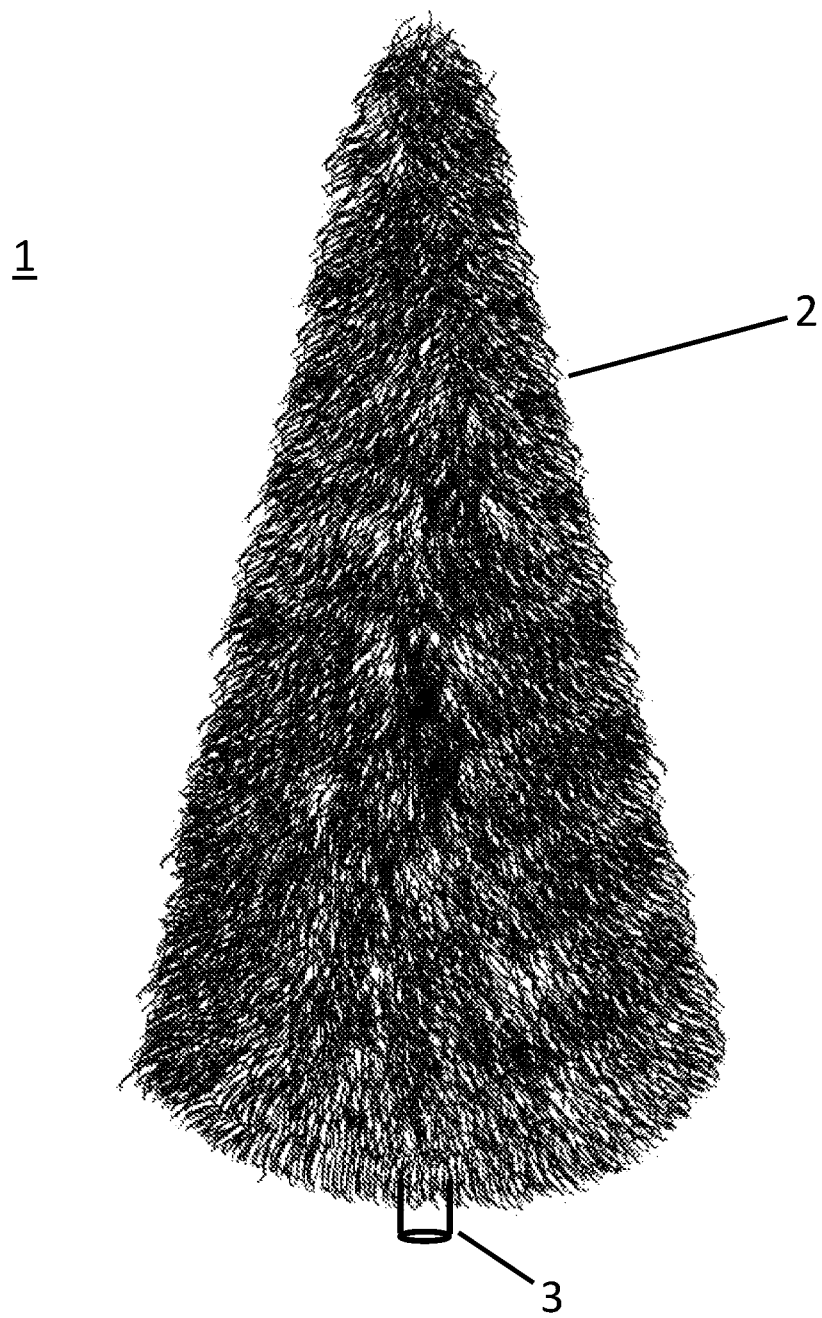
FIG. 1 is a perspective view of the artificial tree.
Figure 2:
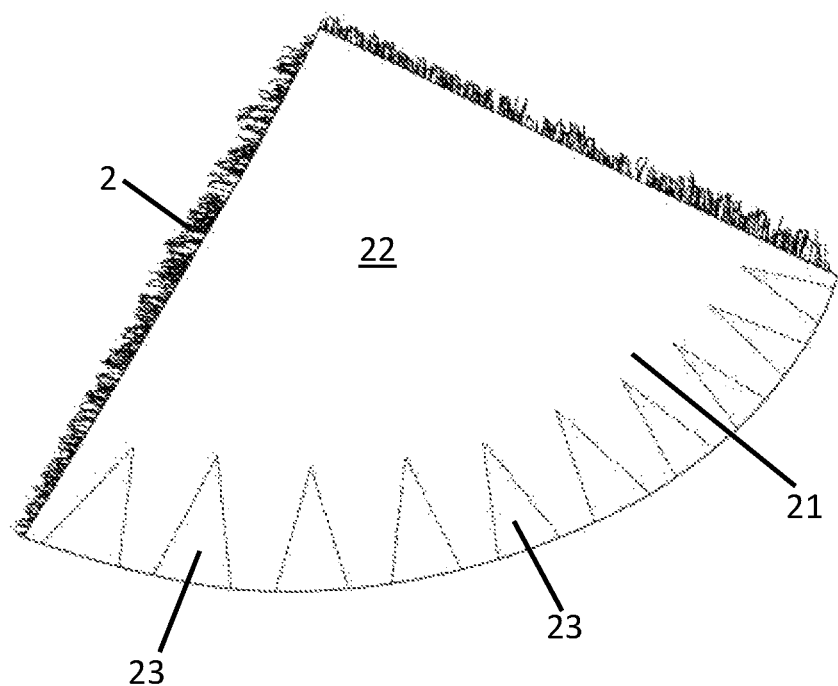
FIG. 2 is an inside view of the polymeric woven outer layer before shaping.
Figure 3:
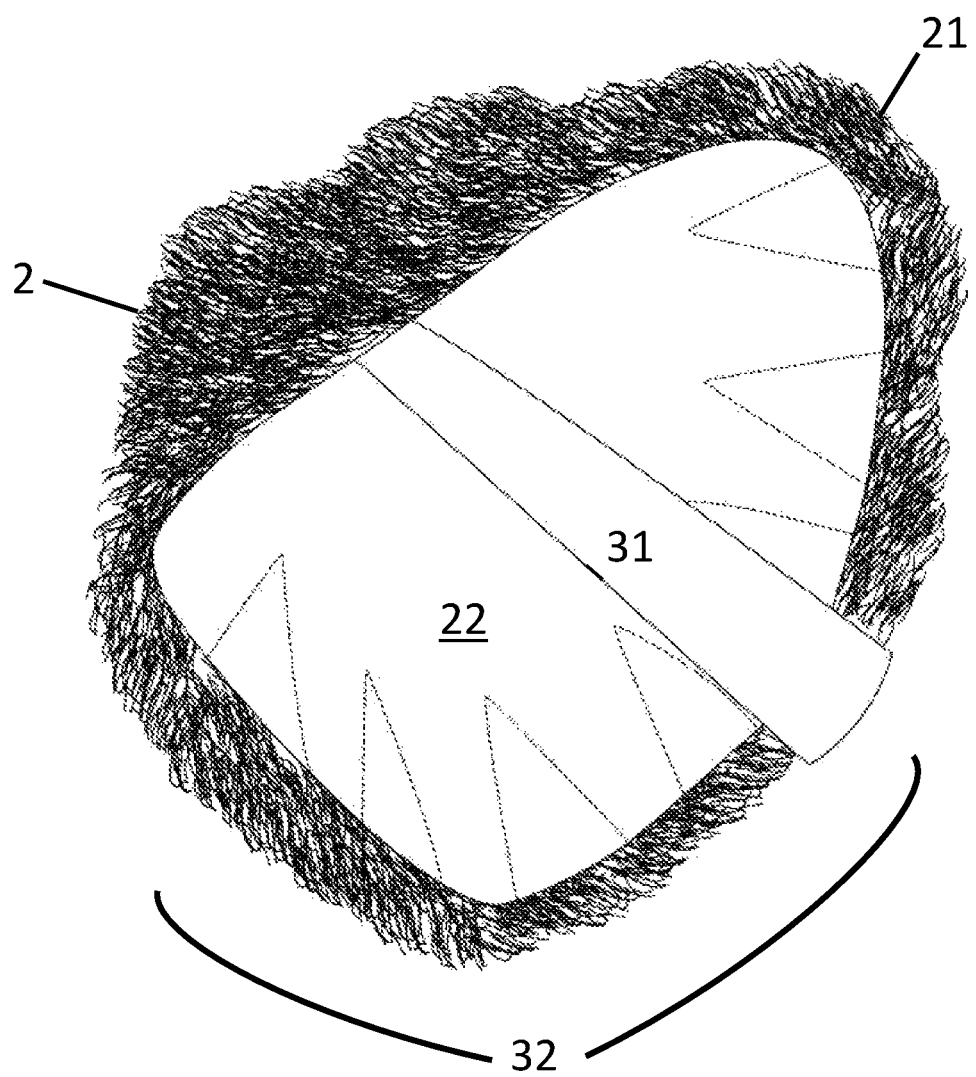
FIG. 3 is an inside perspective view of the polymeric woven outer layer formed into a desired conical shape.
Figure 4:
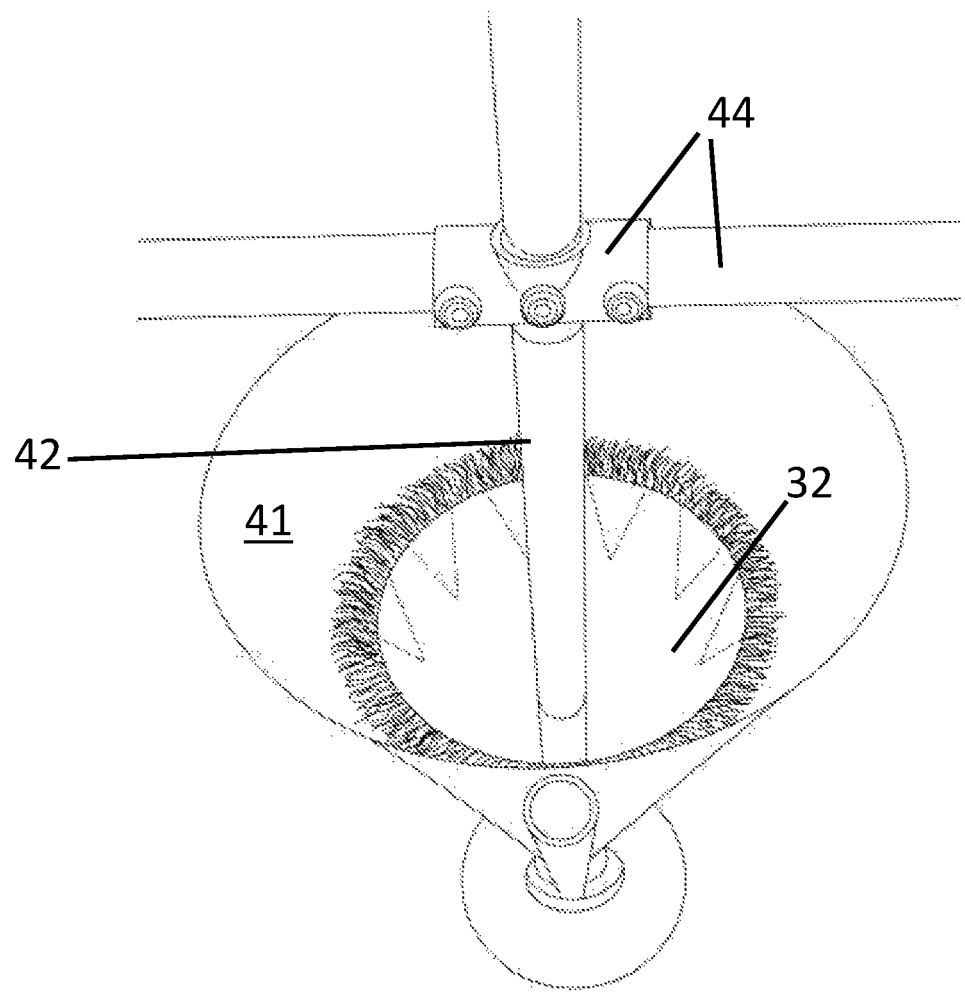
FIG. 4 is a perspective view of the polymeric woven formed outer layer positioned in a mold with a jig holding the center tube awaiting expanded foam core.
Figure 5:
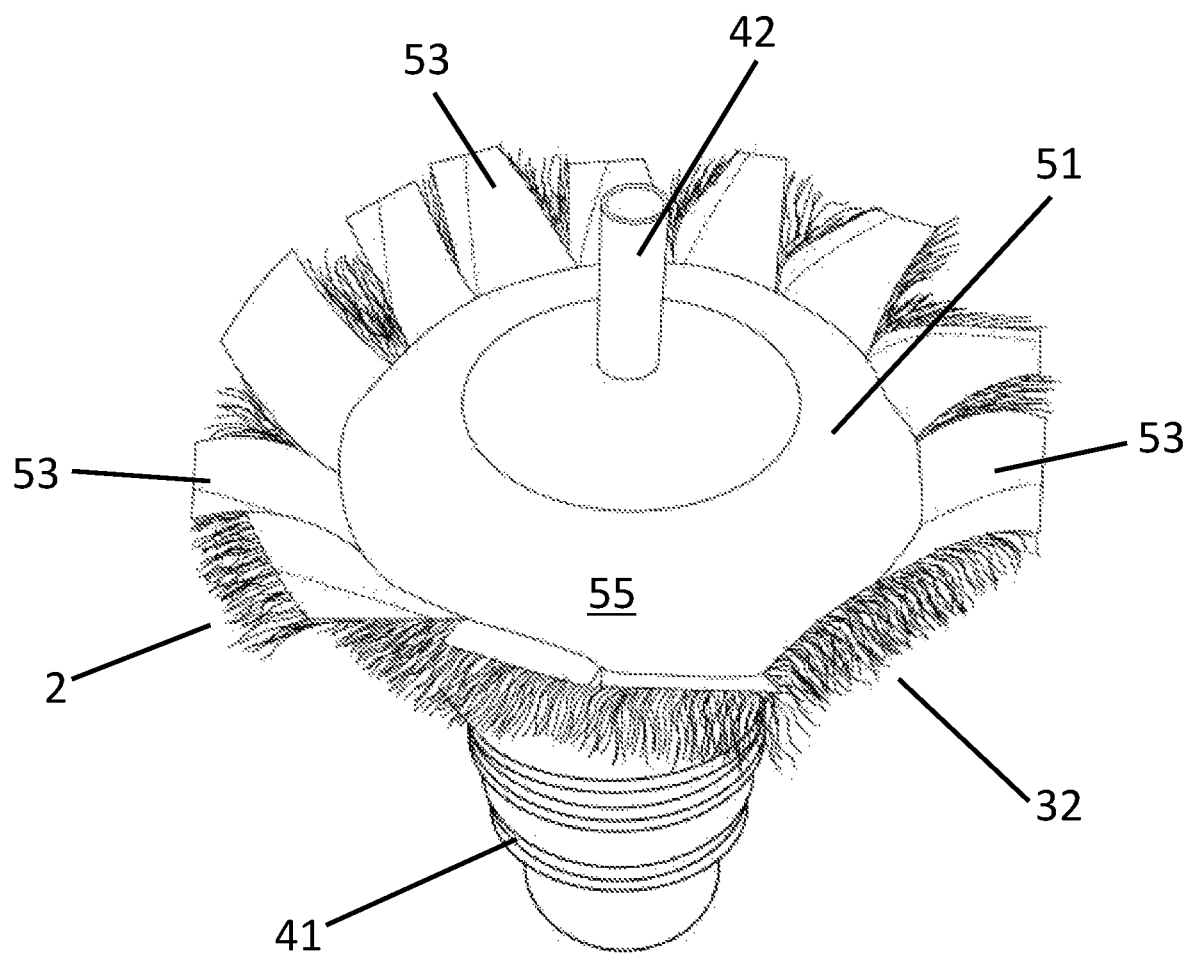
FIG. 5 is a perspective view of the solidified expanded foam core with the tube jig removed.
Figure 6:
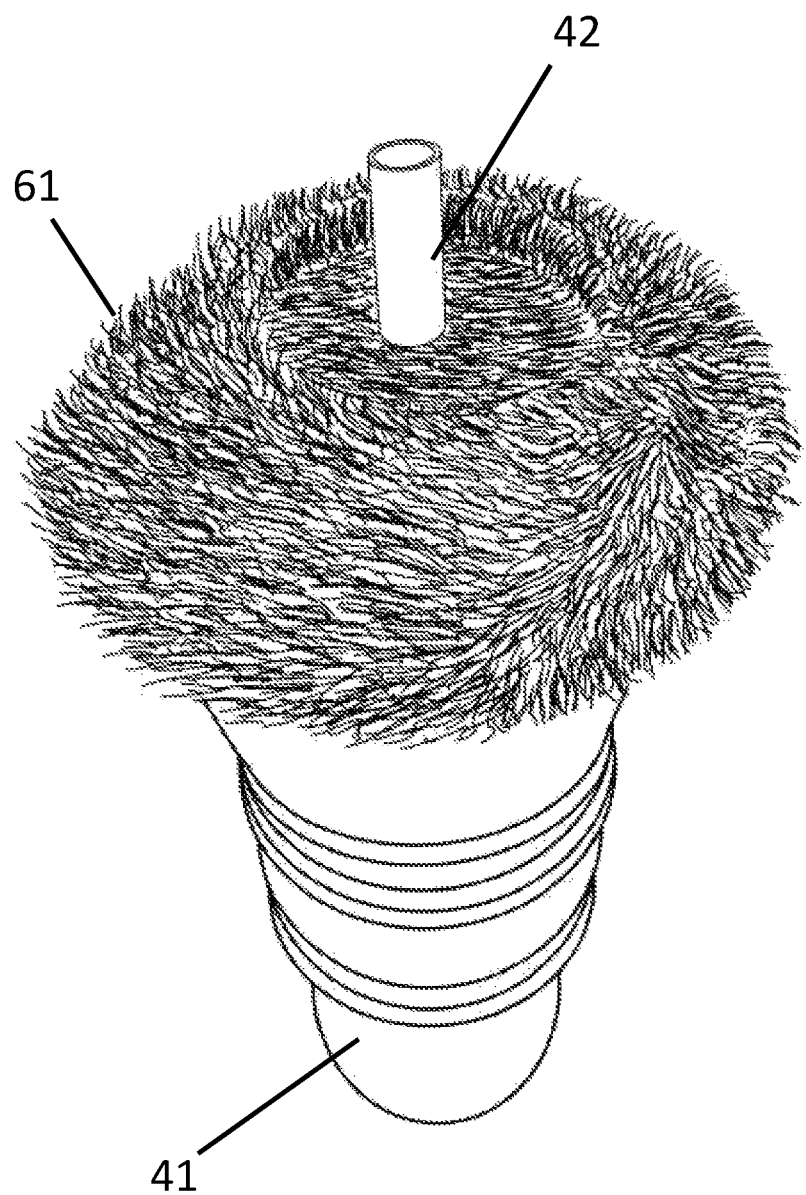
FIG. 6 is a view of additional bottom layer added to the tree.

While this invention is susceptible to embodiment in many different forms, there is shown in the drawings, and will herein be described in detail, specific embodiments with the understanding that the present disclosure of such embodiments is to be considered as an example of the principles and not intended to limit the invention to the specific embodiments shown and described. In the description below, like reference numerals are used to describe the same, similar, or corresponding parts in the several views of the drawings. This detailed description defines the meaning of the terms used herein and specifically describes embodiments in order for those skilled in the art to practice the invention.

Definitions

The terms "about" and "essentially" mean±10 percent.
The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term "comprising" could be separated into one or more claims using "consisting" or "consisting of" claim language and is so intended.

Reference throughout this document to "one embodiment", "certain embodiments", "an embodiment", or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or", as used herein, is to be interpreted as an inclusive or meaning any one or any combination. Therefore, "A, B, or C" means any of the following: "A; B; C; A and B; A and C; B and C; A, B, and C". An exception to this definition will occur only when a combination of elements, functions, steps, or acts are in some way inherently mutually exclusive.

The drawings featured in the figures are for the purpose of illustrating certain convenient embodiments of the present invention, and are not to be considered as limitation thereto. The term "means" preceding a present participle of an operation indicates a desired function for which there is one or more embodiments, i.e., one or more methods, devices, or apparatuses for achieving the desired function, and that one skilled in the art could select from these or their equivalent in view of the disclosure herein, and use of the term "means" is not intended to be limiting.

As used herein, the term "artificial tree" refers to a constructed object made of synthetic and artificial materials, designed to resemble a real tree, bush, or the like. For example, the tree can be most any predetermined shape including globe, conical, and the like such that it resembles a tree. It has a straight artificial trunk in one embodiment, all the materials are synthetic. It is made of three parts: the polymeric woven outer layer, the solidified foam core, and the center straight tube. There are no fragile parts, loose pieces, or open cavities in which insects or animals could nest or inhabit.

As used herein, the term "polymeric-woven outer layer" refers to material for the outside of the artificial tree which is made in polymeric-woven sheets. As an example, artificial grass is available woven as a polymeric artificial grass that resembles growing foliage. One advantage of polymeric woven layer is their resistance to weather which means such a tree will have a long life in the outdoors.

As used herein, the term "solidified expanded foam core" refers to polymeric material which upon curing, e.g., by heat radiation or the like, solidifies. One common material is expanded polystyrene. Others include polyurethane expanding foam open and closed cell, cross-linked PVC foam, thermoplastic foam, syntactic foam, linear PVC foam, polymethacrylimide foam, and the like.

As used herein, the term "straight tube" or "straight post" refers to a rigid member positioned in the center of the foam core such that it appears and acts like the straight trunk of a real tree. See especially FIG. 1. In one embodiment, it is a metal straight tube such as aluminum or other metal. In another embodiment, it is a straight wood or metal post. The chosen tube or post must be sufficiently strong to hold the tree upright. The tube or post can then be stuck in the ground, put on a post that is in the ground, or by any other means for planting the artificial tree outside. In one embodiment, it is a 2 inch diameter aluminum metal tube though other straight metals tubes can be used.

As used herein, the term "fused" refers to the uncured foam core being positioned inside the shaped outer layer. Upon curing to its solidified form, the foam will bond the outer layer as well as hold the tube or post in a fused/attached manner.

As used herein, the term "predetermined shape" refers to the final shape that the artificial tree will take. In the Figures is shown a conical shape, but other shapes are contemplated including more global and cubed, cylindrical, trapezoidal, and the like.

As used herein, the term "woven bottom layer" refers to the fact the tree can just have the solidified foam core only covered on the sides by the outer layer, but in this embodiment, a piece of woven material is attached to the bottom of the foam core either during curing or after curing as a separate piece.

As used herein, the term "mold" refers to a device on which the outer layer can be placed and support the shape for filling with the foam core. In one example seen in the figures, a conical shaped outer layer of artificial grass is placed inverted into a conical mold. The polymeric expandable foam can then be poured into the open portion of the outer layer.

As used herein, the term "jig" refers to a device for holding the straight tube or straight post in place while the foam core is cured and solidifies. See the Figures for examples. One of skill in the art could propose other jigs in view of the disclosure herein.

As used herein, the term "cutting and joining" refers to taking one or more pieces of material and cutting it to a shape which can be joined to form the predetermined shape. The Figures show the pieces for a conical tree.

What is claimed is:

1. An artificial tree consisting of:
   a) a polymeric woven outer layer in a predetermined shape resembling a tree;
   b) a solidified expanded foam core;
   c) a center straight tube or straight post molded into the solidified expanded foam core positioned in the center of the solidified expanded foam core positioned to be able for the tube or post to be stuck in the ground or put on a ground post; and
   d) wherein the polymeric woven outer layer is fused to the solidified expanded foam core.

2. The artificial tree according to claim 1 wherein the polymeric woven outer layer is woven artificial grass.

3. The artificial tree according to claim 1 wherein the predetermined shape is conical.

4. The artificial tree according to claim 1 wherein the straight tube is an aluminum tube.

5. The artificial tree according to claim 1 wherein the solidified expanded foam core is expanded polystyrene.

* * * * *